United States Patent [19]
Fujii et al.

[11] Patent Number: 4,637,840
[45] Date of Patent: Jan. 20, 1987

[54] COATED ALUMINUM-ZINC ALLOY PLATED SHEET STEEL

[75] Inventors: Haruki Fujii; Shoji Ikada, both of Hyogo; Akimitsu Fukuda, Chiba; Yasuo Okumura, Aichi, all of Japan

[73] Assignee: Nihon Parkerizing Co., Ltd., Tokyo, Japan

[21] Appl. No.: 713,152

[22] Filed: Mar. 18, 1985

[30] Foreign Application Priority Data

Mar. 21, 1984 [JP] Japan ................................... 59-54789

[51] Int. Cl.$^4$ ............................................. C23C 22/26
[52] U.S. Cl. .................................................... 148/6.2
[58] Field of Search ........................................... 148/6.2

[56] References Cited

U.S. PATENT DOCUMENTS

| | | | |
|---|---|---|---|
| 3,053,692 | 9/1962 | Pocock | 148/6.2 |
| 3,132,055 | 5/1964 | Tanaka | 148/6.2 |
| 3,140,204 | 7/1964 | Tokunaga | 148/6.2 |
| 3,413,158 | 11/1968 | Inouye | 148/6.2 |
| 3,505,128 | 4/1970 | Fujcí | 148/6.2 |
| 3,630,791 | 12/1971 | Yamagishi | 148/6.2 |
| 4,137,368 | 1/1979 | Miller | 148/6.2 |
| 4,170,671 | 10/1979 | Hirasawa | 148/6.2 |
| 4,341,564 | 7/1982 | Schiffman | 148/6.2 |
| 4,373,968 | 2/1985 | Hess | 148/6.2 |

Primary Examiner—Sam Silverberg
Attorney, Agent, or Firm—Arthur E. Kluegel

[57] ABSTRACT

A coating process for aluminum-zinc alloy plated sheet steel provides an article having a surface of improved formability and enhanced corrosion resistance; appearance and paintability. The coating is applied in aqueous form at a prescribed pH value and dried. The aqueous coating contains a water dispersible or water soluble resin and hexavalent chromium in desired proportions.

5 Claims, No Drawings

COATED ALUMINUM-ZINC ALLOY PLATED SHEET STEEL

BACKGROUND OF THE INVENTION

This invention concerns aluminum-zinc alloy plated sheet steels which have been subjected to a coating treatment. Aluminum-zinc alloy plated sheet steels are sheet steels which have been plated with an alloy which consists of 4-75% by weight of aluminum, the remainder being mainly zinc with traces of other components such as silicon, magnesium, cerium-lanthanum etc. At the present time two such types of sheet steel are being manufactured, namely low aluminum-zinc alloy plated sheet steels which are plated with an alloy consisting of 4-10% by weight of aluminum, the remainder consisting mainly of zinc with traces of magnesium or cerium-lanthanum, and high aluminum-zinc alloy plated sheet steels which are plated with an alloy consisting of 55% by weight of aluminum, 43.4% by weight of zinc and 1.6% by weight of silicon. If the thickness of the plated layer on these sheets is the same as that on the molten zinc plated sheet steels in general use the corrosion resistance is improved by a factor of some 1.5-2 times in the case of the low aluminum-zinc plated sheet steels and by a factor of some 3-6 times in the case of the high aluminum-zinc alloy plated sheet steels. Furthermore the high aluminum-zinc alloy plated sheet steels also have heat reflecting properties and excellent resistance to heat. As a result of their excellent properties these aluminum-zinc alloy plated sheet steels have found wide application as building materials in the form of roofing and walling materials etc., in civil engineering applications as guard rails, sound insulating barriers, anti-snow fencing, drainage gullies etc., as materials for automobiles, domestic appliances and industrial machinery and as base materials for painted sheet steels.

However, since the plated layer on these aluminum-zinc alloy plated sheet steels contains aluminum it is harder than the plated layers which are found on molten zinc plated sheet steels. As a result of the hardness of the plated layer the effective lubrication between the aluminum-zinc alloy plated sheet steel and rolls or pressing dies when roll forming or press molding these materials is poor: the surface is liable to damage; the plated layer may become fused onto the forming rolls or the pressing dies as a result of the heat which is generated by friction during such operations; and metal powder which has become detached from the aluminum-zinc alloy plated sheet steel may become attached to the forming rolls or the pressing dies. This powder may accumulate in the corner parts of a molded product and give rise to a grazing effect or it may cause defects such as wounds and abrasions etc. which alter the external appearance of the product.

In the past these problems have been overcome by coating the surface of the aluminum-zinc alloy plated sheet steel with a lubricant such as oil or wax using a roll coater when carrying out shaping operations in order to provide the required lubrication at the surface of the aluminum-zinc alloy plated sheet steel so that adequate slip occurs between the aluminum-zinc alloy plated sheet steel and the forming rolls or the pressing dies. However when such lubricating oils are used there is a danger that if the aluminum-zinc alloy plated sheet steel is subsequently used as a roofing material for example the operator who is doing the work may slip on the oil, and if a coating is to be applied to the aluminum-zinc plated sheet steel after the shaping process it is essential that all of the lubricating oil should be removed from the surface and this is troublesome. Furthermore when aluminum-zinc alloy plated sheet steel is shaped using a lubricating oil in the way described above the lubricating oil becomes attached to the forming rolls or the pressing dies and if at a later stage surface coated sheet steel is shaped using these same forming rolls or pressing dies the lubricating oil is transferred to the coated surfaces of these coated sheet steels which are thereby stained and any small amounts of metal powder which are produced during the shaping process become attached to the coated surface by way of the lubricating oil and so it is necessary to clean the forming rolls or pressing dies thoroughly before carrying out such operations in order to prevent the occurrence of this type of contamination and this is very troublesome. Furthermore, as in the case of the molten zinc plated sheet steels, the surfaces of aluminum-zinc alloy plated sheet steels are often subjected to a chromate treatment in order to prevent the formation of rust due to the humidity while the material is being stored. Aluminum-zinc alloy plated sheet steels have a higher resistance to rusting than molten zinc plated sheet steels, but unlike the white rust like changes which are seen to occur with molten zinc plated sheet steels the aluminum-zinc alloy plated sheet steels develop a gray to black discoloration and since this downgrades the external appearance of the material to a considerable degree they are often subjected to a chromate treatment. However if in this case the aluminum-zinc alloy plated sheet steels is treated with a water soluble lubricating oil this can lead to problems with pollution due to the dissolution of the chromate.

Hence the formation on the surface of the aluminum-zinc alloy plated sheet steels of a skin film which has lubricating properties, which provides excellent corrosion resistance and which forms a suitable undercoat for painting is desirable but as yet no surface treating agents for the formation of skin films which have these properties have been proposed. Thus conventionally surface treatments such as the chromate treatment mentioned above and non-chromate treatments such as titanic acid based treatments, polyphosphoric acid based treatments etc. in which no chromium is used have been employed. The reactive type chromate treatments necessitate chromium effluent treatment since the chromium is dissolved out in the water washing operation during the manufacturing process while with the painting dry type chromate treatments the chromium dissolves out in the degreasing process which is carried out by the end user and so in this case chromium effluent treatment is still required at this stage. This means that the non-chromate treatments are preferred, but these treatments have disadvantages in that the corrosion resistance is poor after such treatments and there are problems with the cost of the treatments. Furthermore with the aluminum-zinc alloy plated sheet steels there is no lubrication effect in shaping operations when a simple chromate skin film is formed with a chromate treatment because of the hardness of the plated layer and so it is still necessary to use a lubricating oil during such operations. Hence there is as yet no surface treatment agent which is able to provide a skin film which provides good lubrication properties, which provides excellent corrosion resistance, and which forms a good undercoat for paints on the surface of aluminum-zinc alloy plated sheet steels, and the provision of such a surface treatment agent is desirable.

The purpose of the invention is to provide coated aluminum-zinc alloy plated sheet steels for which the above-mentioned difficulties have been overcome in that they have adequate lubrication properties in shaping operations such as roll forming and press molding etc. without the need for the use of a lubricating oil; in that they have excellent corrosion resistance; and in that they can be painted directly without having to remove the skin film even if they are painted after shaping.

SUMMARY OF THE INVENTION

The distinguishing feature of the coated aluminum-zinc alloy plated sheet steels of this invention are that, for coated aluminum-zinc plated sheet steels on the surface of which a resin skin film is provided, the resin skin film is formed with a resin composition at pH 3–10 in which hexavalent chromium is compounded at the rate of 1/500–1/10 by weight with respect to the solid fraction of the resin, the resin being a water dispersible or water soluble resin which has an acid value of 10–200.

DETAILED DESCRIPTION OF THE INVENTION

Suitable water dispersible and water soluble resins for this purpose are those resins which have an acid value of 10–200 prepared by the incorporation of monomers which include, for example, carboxyl groups such as acrylic acid, methacrylic acid and maleic acid etc. into polyvinyl acetate emulsions, vinylacetate-acrylate ester emulsions, vinylacetate-ethylene emulsions, acrylate ester copolymer emulsions, acrylic acid-styrene copolymer emulsions, vinylidene chlordie copolymers, vinylchloride copolymers, polyethylene emulsions, epoxy resin emulsions, butadiene-styrene latex, and butadiene-acrylonitrile latex. If the acid value of the aforementioned resin is less than 10 the adhesivity with paint films is reduced and so if the aluminum-zinc alloy plated sheet steel is to be painted after a shaping operation has been carried out it is not possible to paint the sheets directly using the resin skin film of the surface treatment as an undercoat for the paint. That is to say that the direct painting properties of the material are poor. Furthermore if the acid value of the aforementioned resin is greater than 200 the resin skin film has poor water resistance, being readily permeated by water, and the intended level of corrosion resistance is not attained.

Anhydrous chromic acid, ammonium bichromate, potassium bichromate, sodium bichromate, ammonium chromate, potassium chromate, sodium chromate etc. can be used as compounds for the incorporation of the hexavalent chromium but the use of ammonium salts which are easily dispersed during film formation or anhydrous chromic acid which does not contain any involatile alkali component is preferred. One or more of these hexavalent chromium compounds is added to and compounded with the above mentioned water dispersible or water soluble resins. The rate of addition is 1/500–1/10 parts of hexavalent chromium by weight with respect to the solid fraction of the resin, which is to say that some 0.2 to 10 parts by weight of hexavalent chromium must be used per 100 parts by weight of resin solid fraction. If the hexavalent chromium is added at a rate of less than 1/500 with respect to the resin solid fraction the treated material lacks corrosion resistance and is still subject to blackening, while if the rate of addition of hexavalent chromium is greater than 1/10 with respect to the resin solid fraction the resin fraction gels and it is impossible to obtain a stable treatment liquor for coating aluminum-zinc alloy plated sheet steels.

The treatment liquor obtained by compounding hexavalent chromium compounds into a water dispersible or water soluble resin in the way described above is adjusted to a pH within the range 3–10 or preferably within the range 4–8. If the pH of the treatment liquor is less than 3 or greater than 10 the aluminum and zinc in the aluminum-zinc alloy plating dissolve in the treatment liquor, since they are both amphoteric metals, and they become admixed in the resin skin film which is formed and this reduces the flexibility of the resin skin film and the intended lubrication properties cannot be obtained. The usual alkalis can be used to adjust the pH of the treatment liquors to within the above mentioned range but the preferred alkalis are the volatile alkalis such as ammonia and amines such as monoethylamine, diethylamine, triethylamine etc., or alkanolamines such as monoethanolamine, diethanolamine, triethanolamine etc.

The resin composition in the form of a surface treatment liquor obtained by compounding hexavalent chromium compounds with water dispersible or water soluble resin prepared in the way described above is coated onto the aluminum-zinc alloy plated surface to provide the surface treatment and this coating can be achieved using the normal coating methods such as dipping, spraying, brushing, roll coating or by using an air knife or electrostatic coating techniques, after removing any grease or dirt etc. from the surface of the aluminum-zinc alloy plated sheet steel. After coating in this way the product is heated in a hot air drier, infrared heater or induction heating device for example to evaporate off the water content and produce a dry film, thus forming a resin skin film on the surface of the aluminum-zinc alloy plated sheet steel. The resin skin film may be formed on both sides of the aluminum-zinc alloy plated sheet steel or it may be formed on one side only. A dry skin film weight of 0.3–5.0 $g/m^2$ is required to ensure adequate lubrication during operations such as roll forming or press molding and a skin film weight of 1–3 $g/m^2$ is preferred in respect of welding properties and corrosion resistance etc. and also in respect of cost. If the weight of skin film is less than 0.3 $g/m^2$ it is difficult to cover the surface of the aluminum-zinc alloy plated sheet steel completely and the intended level of corrosion resistance is not attained, while if the skin film weight exceeds 5.0 $g/m^2$ problems arise with poor welding properties and such weights are also disadvantageous in terms of cost. The actual process for the manufacture of aluminum-zinc alloy plated sheet steels which have been treated with the aforementioned resin compositions involves plating the steel plates in a molten metal tank in the aluminum-zinc alloy plated sheet steel production plant, cooling the plated sheets and then correcting the shape of the aluminum-zinc alloy plated sheet steel in surface correction plant such as a rolling mill or a tension leveler, carrying out the surface treatment with the resin composition, drying and cooling and finally coiling up the coated aluminum-zinc alloy plated sheet steel using a tension roll.

The coated aluminum-zinc plated sheet steel obtained in this way has good lubrication properties on account of the skin film which is present on the surface and it can be shaped by roll forming or press molding etc.

with the formation of very little metal powder. Furthermore the resin skin film on the surface provides excellent corrosion resistance and excellent direct painting properties.

The invention is illustrated below by means of actual examples.

EXAMPLE 1

The aluminum-zinc alloy plated sheet steel used in this example was of thickness 0.8 mm and width 941 mm, the plating composition was 55% by weight of aluminum, 43.4% by weight of zinc and 1.6% by weight of silicon and the weight of the plating was 90 g/m$^2$ on one side.

The resin composition was prepared by adjusting the pH of a mixture of 500 g/l of acrylic ester, ethyl methacrylate, acrylic acid copolymer (resin solid fraction 40% by weight, acid value 40) and 5 g/l of anhydrous chromic acid to pH 6.5 using aqueous ammonia.

The aforementioned aluminum-zinc alloy plated sheet steel was subjected to a degreasing treatment and the surface was coated with the aforementioned resin composition with a roll coater in such a way as to provide a dry skin film weight of 2 g/m$^2$, the rate of attachment of chromium being 25 mg/m$^2$. Immediately after coating the sheet steel was heated to 120° C. for 9 seconds in a hot air drier, and aluminum-zinc alloy plated sheet steel which had been surface treated with a resin skin film was obtained. The sheet temperature at this time was 60° C. The sheet used for testing was obtained by cooling this material.

EXAMPLE 2

The aluminum-zinc alloy plated sheet steel used in this example was of thickness 0.4 mm and width 190 mm, the plating composition was 55% by weight of aluminum, 43.4% by weight of zinc and 1.6% by weight of silicon and the weight of the plating was 80 g/m$^2$ on one side.

This was treated with the same resin composition as in Example 1 and sheets were obtained for testing.

REFERENCE EXAMPLE 1

Test sheets were obtained by simply degreasing the same aluminum-zinc alloy plated sheet steel as used in Example 2. No surface treatment with a resin composition was carried out in this case.

REFERENCE EXAMPLE 2

Degreased aluminum-zinc alloy plated sheet steel the same as that used in Reference Example 1 was coated with a chromate liquor consisting of 10 g/l of chromic acid and 1 g/l of fluoride using a roll coater in the same way as in Example 1, and the coating was dried. The dried sheet was made into test sheets. The amount of chromium attached to the test sheets was found to be 5 mg/m$^2$ using the fluorescence x-ray method of estimation.

REFERENCE EXAMPLE 3

Test sheets were prepared by spraying chromate treated aluminum-zinc alloy plated sheet steel the same as that used in Reference Example 2 with an emulsion based wax (Johnson No. 700, made by the Johnson Company and diluted 15 times with water) at a coating rate of 15 ml/m$^2$ and drying.

REFERENCE EXAMPLE 4

Test sheets were prepared by spraying chromate treated aluminum-zinc alloy plated sheet steel the same as that used in Reference Example 2 with a mineral oil based wax (Shindoru 3411, made by the Boton Company) at a coating rate of 15 ml/m$^2$ and drying.

REFERENCE EXAMPLE 5

Molten zinc plated sheet steel (galvanized iron sheet) with a plated weight of 225 as specified in the JIS, of thickness 0.4 mm and width 190 mm was used for the sheet steel in this case. The surface was degreased by spraying for 20 seconds at 60° C. with a weakly alkaline degreasing agent, rinsed with water in a water spray for 10 seconds and then subjected to a similar chromate treatment to that described in Reference Example 2 to form the test sheet.

The test sheets obtained in the aforementioned Examples 1 and 2 and Reference Examples 1, 2, 3, 4 and 5 were subjected to roll forming tests, corrosion resistance tests, discoloration (blackening) tests and direct painting tests.

The roll forming test was carried out by sending a 11 test sheet of length 1500 m of the material obtained in Example 1 straight from the coil at the rate of 50 m/minute and roll forming to the shape shown in FIG. 1 with a peak height $h_1$ of 130 mm and a working width $h_2$ of 550 mm. An assessment was then made of the state of metal pick-up on the rolls and the external appearance of the product. After carrying out this roll forming test a single sheet of white painted galvanized sheet was passed through the same rolls and shaped in the same way and an assessment was made by observing the state of staining of the transcribed onto the galvanized sheet. Two hundred and fifty test sheets of length 2 m obtained in Example 2 and in Reference Examples 1, 2, 3, 4 and 5 were roll formed at a speed of 50 m/minute into products with the cross sectional shape shown in FIG. 2, where $h_3=44$ mm, $h_4=19$ mm, $h_5=12$ mm, $h_6=91$ mm, $h_7=67$ mm and $h_8=12$ mm. In each case an assessment was made in the same way as described above. The standards employed for the assessment of the roll forming properties of the sheets are shown in Table 1.

TABLE 1

| Assessment | Metal Pick-up Properties | External Appearance of the Product | Staining of the white painted galvanized sheet |
| --- | --- | --- | --- |
| 10 | No metal powder attached to the roll Good | Good | No staining Good |
| 5 | Metal powder attached to the roll | Metal marks produced in the corner parts of the product | |
| 0 | Metal attached and baked onto the roll | Metal marks and a disturbance of the surface treatment material | Staining occurs |

The corrosion resistance was tested by carrying out salt water spray tests in accordance with JIS Z 2371. The discoloration (blackening) tests were carried out by storing two test sheets which had been cut to a size of 0.4×60×150 mm in a refrigerator for 1 hour at a temperature of 5° C., removing them from the refrigerator and wrapping them together with the test surfaces facing each other in paper which was coated on one side with vinyl as soon as condensation had formed on the sheets. The wrapped sheets were then set in a jig under a pressure of 70 kg·f/cm² and left to stand for 7 days in a humidity tester at 50° C., 95% RH. The state of blackening was then assessed visually. The standards employed in the corrosion resistance tests and the discoloration (blackening) tests are shown in Table 2.

TABLE 2

| Assessment | Corrosion Resistance | Resistance to Blackening |
| --- | --- | --- |
| 5 | Area of white rust 0% | Area of blackening 0% |
| 4 | Less than 10% | Less than 10% |
| 3 | 11–25% | 11–25% |
| 2 | 26–50% | 26–50% |
| 1 | More than 51% | More than 51% |

The direct painting properties were evaluated by coating test sheets with an aminoalkyd paint (Amirakku No. 1, made by Kansai Paint Co.) to a dry film thickness of 20 μm at a pencil hardness of 2H and then carrying out a checker board test. The checker board test was carried out by cutting eleven orthogonal lines in both the longitudinal and transverse directions on the coated test sheet using a sharp blade to form 100 individual squares. Sticky tape (Sellotape) was then stuck onto the surface and quickly stripped off, the direct painting properties being assessed by counting the number squares of paint film remaining on the test sheet.

The results obtained in the roll forming tests, corrosion resistance tests, blackening resistance tests and direct paint property tests described above were as shown in Table 3.

TABLE 3

| | Test | | | | | |
| --- | --- | --- | --- | --- | --- | --- |
| | Roll Forming Properties | | | | | |
| Test Sheet | Metal Pick-up Properties | External Appearance of the Product | Staining of white painted galvanized Sheet | Corrosion Resistance (S'ST) 72 Hrs. | Blackening Resistance | Direct Painting Properties (Checker Test) |
| Example 1 | 10 | 10 | 10 | 5 | 5 | 100/100 |
| Example 2 | 10 | 10 | 10 | 5 | 5 | 100/100 |
| Ref. Ex. 1 | 0 | 5 | 0 | 1 | 3 | 85/100 |
| Ref. Ex. 2 | 0 | 5 | 0 | 4 | 5 | 85/100 |
| Ref. Ex. 3 | 5 | 0 | 0 | 3 | 4 | Uniform paint not obtained |
| Ref. Ex. 4 | 5 | 0 | 0 | 3 | 4 | Uniform paint not obtained |
| Ref. Ex. 5 | 5 | 5 | 0 | 1 | 3 | 96/100 |

The results shown in Table 3 confirm that the sheets obtained in Examples 1 and 2 had superior roll forming properties, corrosion resistance, blackening resistance and direct painting properties.

What is claimed is:

1. A process for cold forming the surface of aluminum-zinc alloy plated sheet steel comprising (1) contacting the surface with an aqueous composition of a water dispersible or water soluble resin having an acid value of from 10 to 200, from 0.2 to 10 parts of hexavalent chromium per 100 parts of solid resin and exhibiting a pH value of from 3 to 10, (2) thereafter drying the coating and (3) subjecting the sheet to cold forming without the use of a lubricating oil.

2. The process of claim 1 wherein the dry weight of the applied coating is from 0.3 to 5 g/m².

3. The process of claim 1 wherein the pH value is from 4 to 8.

4. The process of claim 2 wherein the coating weight is from 1 to 3 g/m².

5. The process of claim 1 wherein the sheet is painted subsequent to the forming operation.

* * * * *

UNITED STATES PATENT AND TRADEMARK OFFICE
CERTIFICATE OF CORRECTION

PATENT NO. :   4,637,840
DATED      :   January 20, 1987
INVENTOR(S) :  Haruki Fujii; et al It is certified that error appears in the above-identified patent and that said Letters Patent is hereby corrected as shown below:

Column 6, Line 27    Delete --to the shape shown in FIG. 1--

Column 6, Line 39    Delete --shown in FIG.--

Column 6, Line 40    Delete --2--

Signed and Sealed this

Eleventh Day of August, 1987

Attest:

DONALD J. QUIGG

*Attesting Officer*    *Commissioner of Patents and Trademarks*